W. H. Newby,
Cage Trap,
No. 54,393. Patented May 1, 1866.

Witnesses.

Inventor
W. H. Newby
per Munn & Co.
Attorneys

UNITED STATES PATENT OFFICE.

WILLIAM H. NEWBY, OF SEYMOUR, INDIANA.

IMPROVEMENT IN ANIMAL-TRAPS.

Specification forming part of Letters Patent No. 54,393, dated May 1, 1866.

*To all whom it may concern:*

Be it known that I, WILLIAM H. NEWBY, of Seymour, in the county of Jackson and State of Indiana, have invented new and useful Improvements in Animal-Traps; and I do hereby declare that the following is a full, clear, and exact description thereof, which will enable others skilled in the art to make and use the same, reference being had to the accompanying drawings, forming part of this specification.

The present invention consists in a novel arrangement of an animal-trap, by which the rat or other animal in reaching for the bait used causes the trap to close and incase it therein. When passing from such cage to another and adjoining one the trap is caused to set itself, as will be hereinafter more particularly described, reference being had to the accompanying plate of drawings, of which—

Figure 2:
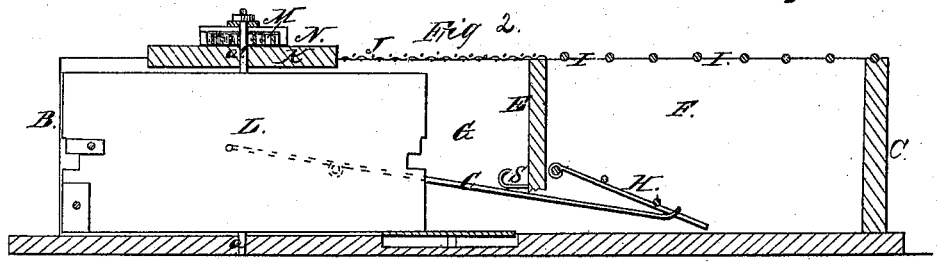
Figure 1:
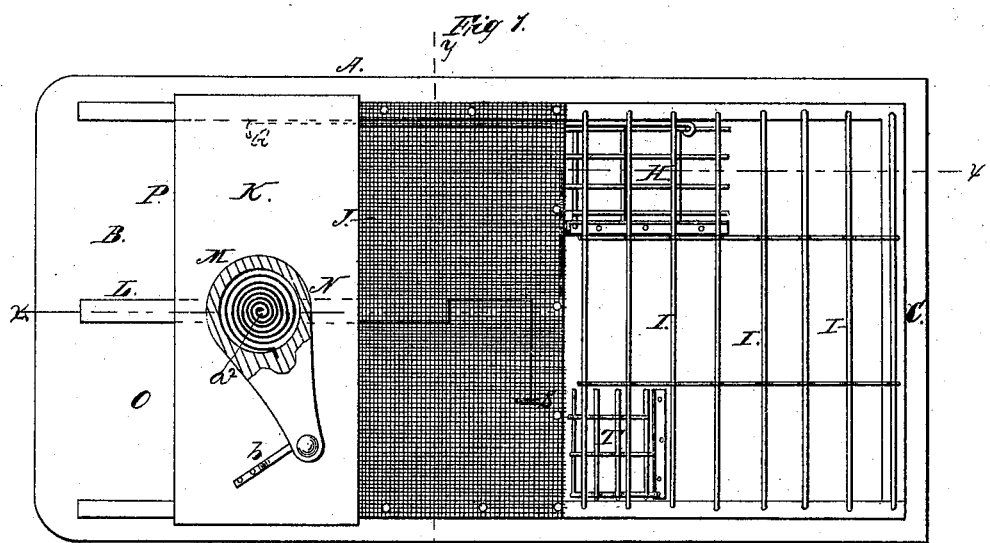
Figure 3:
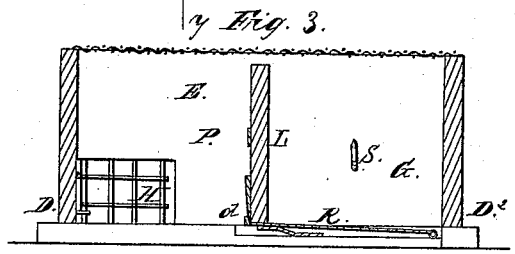
Figure 4:
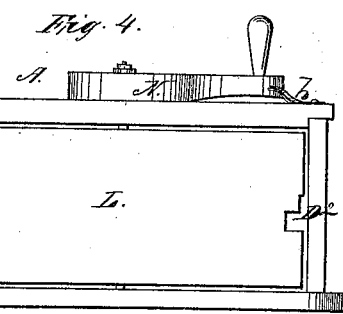

Figure 1 is a plan or top view of the trap; Fig. 2, a longitudinal vertical section taken in the plane of the crooked line $x\,x$, Fig. 1; Fig. 3, a transverse vertical section in plane of line $y\,y$, Fig. 1; Fig. 4, a view of the front or open end of the trap.

Similar letters of reference indicate like parts.

A in the drawings represents a box made of wood or any other suitable material, and of the proper size and shape, it being shown in the drawings as of a rectangular shape. This box at one end, B, is open, but closed at its other end, C, and upon its two sides, D D, and is divided transversely at or near its center by a partition, E, into two separate or distinct chambers, F and G, communication with which is had through a wire swinging door, H, of the said partition E. The top of the chamber F is protected by a series of parallel wires, I I, fastened across the same, and that of the chamber G partially by a wire-netting, J, and a cross-board, K, as plainly shown in Fig. 1. In the open end B of the chamber G is hung a door, L, upon center pins or trunnions, $a\,a^2$, turning in the upper and lower sides of the same, which door when swung across the open end entirely closes the same, the upper trunnion, $a^2$, passing entirely through the upper cross-band, K, of the box.

To the projecting end of trunnion-pin $a^2$ above the box the inner end of a coiled spring, M, is fastened, the other or outer end of the said spring being fastened to the inside of a crank-handle, N, loosely hung and turning upon said trunnion-pin $a^2$, by turning which handle N to the right or left, as the case may be, the said coiled spring is caused to be tightly wound about and around the said trunnion-pin $a^2$, the spring-pawl $b$, engaging with said handle, holding it stationary, thus retaining the said spring coiled or wound up, as explained.

When the door L is swung across the box the trap is closed, and the chamber G then being subdivided into chambers O and P, a catch or hook, Q, of a lever-rod, $c$, hung and turning upon a fulcrum of one side of the box, holding it in such position, the said lever-rod being connected and hung at its inner end to the swinging trap-door H of the two chambers F and G, so that by swinging said door upward the hook is released from the cross-door L, which then, by the action of the coiled spring secured to its trunnion-pin $a^2$, as explained, swings around within the box, coming to a stop against the raised lip or edge $d$ of a spring-platform, R, hinged to the bottom of the box at and along one of its sides, $d^2$, and extending partially across the box along its partition F, in which position it is held thereby until released by depressing the platform, when it continues its motion till it comes back to its original position across the box, when the catch interlocks with it and holds it, as before explained, the door when held by the platform of the box, as described, then being parallel or nearly so with the sides of the box and midway between them. (See Fig. 1.)

Over the platform R and to the partition L of the box is fixed a hook, S, upon which the bait to be used in the entrapping of the animal by the trap is to be hung or secured in any proper manner.

When the trap constructed and arranged as above described is to be used, its door L is first secured in the position shown in Fig. 1, or, in other words, so as to be parallel with the sides of the box, the platform-lip holding it so, when the hook S is baited and the trap fully prepared or set and ready to be placed in the desired locality. Thus it will be seen that a passage is left perfectly free and clear of all obstructions to the bait-hook—a quite important desideratum—so that there is nothing to impede the entrance of the rat or other animal to the trap to obtain the bait hung on the said hook S, as before explained, in reaching for or striving to obtain possession of which the animal is obliged to step upon the hinged platform, thus depressing it and releasing the door L, which immediately closes and incases the animal within the inner chamber of the open-ended chamber of the trap, securely holding the same therein, when, the animal passing through the trap door of the partition to the light-chamber F, the door of the trap again opens and swings back to the position in which it was described as set, or, in other words, the trap is reset at the same time, as is obvious without further explanation, the coiled spring operating the swinging door of the trap in each case.

T is a swinging trap-door, through which the animals caged in the chamber F of the trap are removed.

I claim as new and desire to secure by Letters Patent—

The arrangement of the door L and spring M, in combination with the tilting platform R, the trap-door H, lever-rod c, and catch q, constructed and operating in the manner and for the purpose herein specified.

WILLIAM H. NEWBY.

Witnesses:
J. W. HOLLINGSWORTH,
GEO. T. POLSON.